Nov. 30, 1954  B. F. HARRISON, JR  2,695,488
HAND-OPERATED HARVESTING IMPLEMENT
Filed Jan. 26, 1953
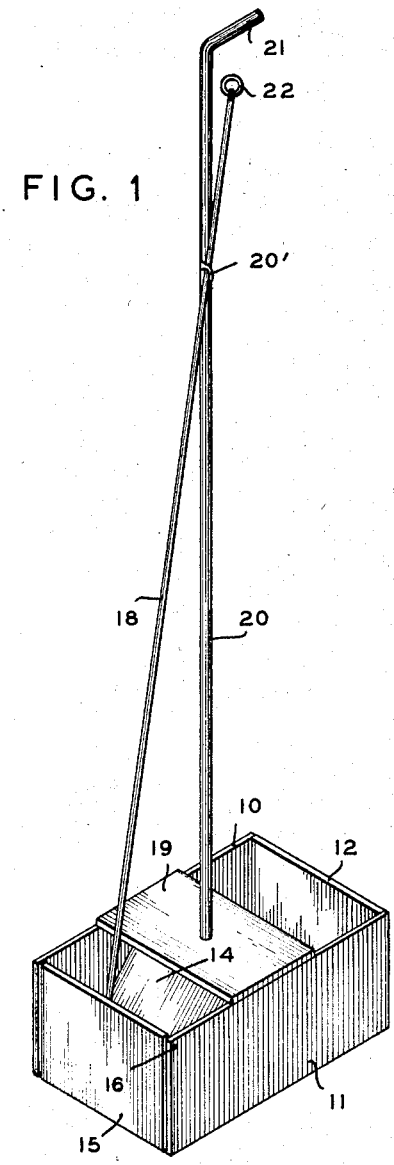
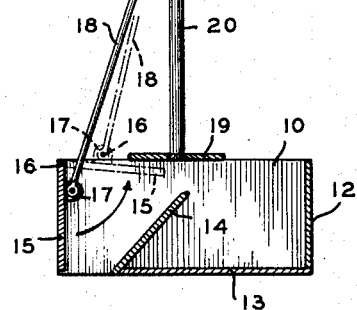
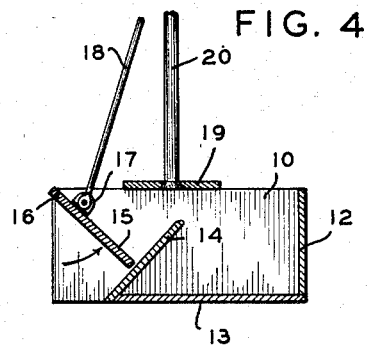
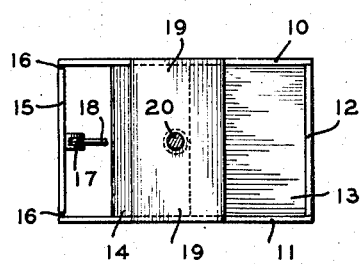
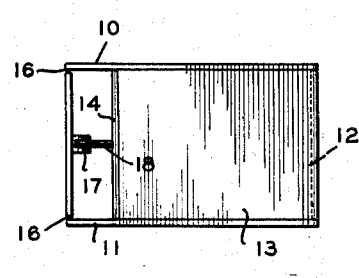
INVENTOR
B. F. HARRISON, JR.
BY
ATTORNEY 17,488

Patented Nov. 30, 1954

2,695,488
HAND-OPERATED HARVESTING IMPLEMENT

Benjamin F. Harrison, Jr., Macon, Ga.

Application January 26, 1953, Serial No. 333,232

5 Claims. (Cl. 56—328)

This invention relates to harvesting and more particularly to a device for the collection of nuts, such as pecans, or other small objects, and is particularly concerned with a hand operated harvesting implement by means of which pecans or other small objects may be rapidly collected without the operator having to stoop.

In the gathering of small objects such as nuts of various kinds, and particularly pecans, it has been necessary to bend or stoop; it has been difficult to collect nuts without collecting undesirable objects such as stones or trash and the amount of time consumed has exceeded the value of the nuts collected.

It is an object of the invention to provide a simple and inexpensive collecting or harvesting device, which can be easily operated with one hand without stooping, to collect nuts free of trash and from which the nuts may be readily discharged.

Other objects and advantages of the invention will become apparent from the following description in conjunction with the accompanying drawing in which Fig. 1 is a perspective view illustrating one application of the invention;

Fig. 2, a bottom plan view;

Fig. 3, a central longitudinal section with the parts in the position they occupy after nuts or other small articles have been collected;

Fig. 4, a central longitudinal section with the parts in an intermediate position; and Fig. 5, a top plan view with parts broken away and shown in section.

Briefly stated, the device of the present invention comprises a receptacle, preferably of rectangular shape with a storage compartment comprising a substantial portion of its length and an inclined wall at one side of such compartment forming a ramp over which nuts introduced or collected are caused to travel. A pivoted door or actuator for propelling the nuts into the receptacle is operated by a member extending upwardly and with its upper end terminating in an operating loop or ring near an upright handle connected to the receptacle. The door is pivoted at the ends adjacent its upper edge and normally is in vertical position with its lower edge spaced from the lower end of the ramp and providing adjacent the ramp a slot into which nuts to be collected are received.

In operation, the device is carried by the handle and is placed so that the nuts will be located in the transverse slot adjacent the end of the device and then by a motion of the finger the door is caused to swing so that its free edge will move upwardly of the ramp to flip nuts from the transverse slot up the ramp and into the collection receptacle.

With continued reference to the drawing, the device of the present invention comprises a box or receptacle having side walls 10 and 11, an end wall 12, and a bottom wall 13, all of which are permanently united in assembled relation.

The bottom wall 13 is slightly shorter in length than the sides and is provided with an inclined ramp forming wall 14 between such sides, the lower transverse edge of the wall 14 being spaced from the end 15 and providing with such end and the sides a transverse nut receiving rectangular space or area. The upper edge of the ramp or wall 14 is disposed at a height somewhat below that of the upper edges of the side walls.

Instead of a fixed end wall corresponding to the wall 12 the receptacle is provided at its end opposite the wall 12, with a swingable end or door 15 mounted on pivots 16 between the sides 10 and 11. Thus, when in a position of rest, the end or door will be retained by gravity in a substantially vertical position, with its lower edge spaced from the lower edge of the wall 14.

In harvesting small articles such as pecans, the device of the present invention is placed over them so that they are located between the side walls 10 and 11, the pivoted wall 15 and the inclined surface of the ramp 14, the upper extremity of the latter being disposed in spaced relation between the upper edges of the sides 10 and 11, slightly more than the size of a nut. This spacing of the upper edge of the ramp 14 below the upper edges of the sides, permits nuts to be projected over the upper end of the ramp into the collection space or compartment behind the latter.

The pivoted end member or door 15 is provided with an ear 17 to which is connected an operating rod 18 for manipulating or swinging the door on the pivots 16 when the device rests substantially on a supporting surface. Since the pivoted door or operating member is pivoted at its upper edge, the connection 17 thereto of the operating mechanism permits swinging movement of the door so that its free edge can move upwardly of the ramp 14 to propel nuts over such ramp into the collection chamber.

A transverse panel 19 is fastened to the side walls 10 and 11, across the top of the center of the receptacle. Anchored to the center of such panel is a supporting post 20, having a handle 21 at its upper end and a guide 20' on said post below such handle.

Adjacent the handle 21 adjacent the upper end of the control rod 18 is attached a ring or operating loop 22 so that when the handle 21 is grasped, a finger in the ring 22 may be contracted for swinging the pivoted end member 15 to project nuts upwardly over the top of the ramp into the bin or receptacle in which the nuts are collected.

It will be apparent that by the present invention a simple box or receptacle preferably of rectangular construction is provided with a receiving end or slot for nuts which can be projected into the device by means of a pivotally mounted end member which normally is held by gravity in a depending position and which can be swung by an operating rod to project nuts into the device. It will further be apparent that the device does not require or depend upon springs for its operation as the operating member normally is maintained in a vertical position by gravity.

The present invention provides a nut harvesting or collecting structure in which the nuts are fully visible at all times, including before and after collection. The actuating mechanism is so constructed that it can be operated rapidly for flipping or batting the nuts into the device and the rapidity of the swinging motion of the actuating member is determined by the pivoting of the operating rod close to the hinge of the member so that the free edge of the latter which is remote from the hinge will be caused to travel rapidly upwardly in an arc, and nuts in front of the lower edge of the same will be propelled up and over the ramp into the storage compartment, the free edge of the operating member being spaced slightly from the surface of the ramp so that it may swing along such surface.

In use the device is placed so that the opening between the operating member and the ramp receives a nut, several nuts, or other small objects, which can be done with ease, and the operating member swung to propel the nuts over the ramp into contact with the overlying panel and deflected into the receptacle.

When the device is operated it can be readily employed for gathering nuts and forcing them over the top of the ramp into the receptacle with the nuts being prevented from being discharged from the receptacle in such collecting operation by means of the plate to which the handle is fastened. This plate is located just above the upper edge of the ramp allowing ample clearance for the nuts collected so that they may pass into the storage compartment without being allowed to escape.

The device is of relatively light weight so that its use will not be tiring and speed of operation will be facilitated. Further the device may be made of any desired size or capacity such as for holding a couple of pounds or more of nuts without emptying the device. Emptying of the device is readily accomplished by simply pouring the nuts out of the top of the rear of the storage compartment of the receptacle.

In order to operate the device in harvesting nuts, only one finger is needed to actuate the operating structure, the remainder of the hand being firmly gripped around the handle. Another prominent feature of the invention is the simplicity of construction with two moving parts and with no adjustments or replacements necessary.

It will be obvious to those skilled in the art that various changes may be made in the invention without departing from the spirit and scope thereof and therefore the invention is not limited by that which is shown in the drawing and described in the specification but only as indicated in the appended claims.

I claim:

1. A harvesting device capable of being used by one hand of an operator while standing erect and comprising a substantially rectangular receptacle having a pair of side walls, an end wall, and a bottom wall connecting said end and side walls but of a length less than that of said side walls and providing a space between said side walls beyond the end of said bottom wall remote from said end wall, a rearwardly inclined transverse wall extending across the end of the bottom wall remote from said end wall and joining said side walls, said transverse wall having an upper edge terminating in spaced relation to the upper edge of said side walls, said transverse wall forming a ramp over which nuts can pass into said receptacle, a vertically disposed wall between said side walls pivoted between and adjacent the upper portion of said side walls at the ends of the latter remote from said end wall, said vertically disposed wall being pivoted in spaced relation to said transverse ramp forming wall a distance slightly greater than the width of said vertical wall so that the latter may swing along said ramp in relatively close relation thereto, an operating rod pivoted to said vertical wall for producing swinging movement thereof to propel nuts over said ramp, and a panel mounted on the side walls transversely over the upper edge of said ramp centrally of said receptacle and permitting the discharge of nuts into said receptacle when propelled by said vertical wall, a mounting post connected to said panel having a hand grip near its upper end, said operating rod having an actuating loop located near said handle to be operated by a finger of the hand gripping said handle.

2. A harvesting device capable of being used by one hand of an operator while standing erect and comprising a receptacle having a pair of side walls, an end wall, and a bottom wall connecting said end and side walls but of a length less than that of said side walls and providing a space between said side walls beyond the end of said bottom wall remote from said end wall, a rearwardly inclined transverse wall extending across the end of the bottom wall remote from said end wall and joining said side walls, said transverse wall having an upper edge terminating in spaced relation to the upper edge of said side walls, said transverse wall forming a ramp over which nuts can pass into said receptacle, a wall pivoted between and adjacent the upper portion of said side walls at the ends of the latter remote from said end wall, to swing along said ramp in relatively close relation thereto, an operating rod pivoted to said vertical wall for producing swinging movement thereof to propel nuts over said ramp, and a panel mounted on the side walls transversely over the upper edge of said ramp centrally of such receptacle and permitting the discharge of nuts into said receptacle when propelled by said vertical wall, a mounting post connected to said panel having a hand grip near its upper end, said operating rod having an actuating loop located near said handle to be operated by a finger of the hand gripping said handle.

3. A harvesting device capable of being used by one hand of an operator while standing erect and comprising a substantially rectangular receptacle having a pair of side walls, an end wall, and a bottom wall connecting said end and side walls but of a length less than that of said side walls and providing a space between said side walls beyond the end of said bottom wall remote from said end wall, a rearwardly inclined transverse wall extending across the end of the bottom wall remote from said end wall and joining said side walls, said transverse wall having an upper edge terminating in spaced relation to the upper edge of said side walls, said transverse wall forming a ramp over which nuts can pass into said receptacle, a vertically disposed wall between said side walls pivoted between and adjacent the upper portion of said side walls at the ends of the latter remote from said end wall, said vertically disposed wall being pivoted in spaced relation to said transverse ramp forming wall a distance slightly greater than the width of said vertical wall so that the latter may swing along said ramp in relatively close relation thereto, an operating rod pivoted to said vertical wall for producing swinging movement thereof to propel nuts over said ramp, said operating rod having an actuating loop to be operated by a finger of the hand gripping said handle.

4. A harvesting device capable of being used by one hand of an operator while standing erect and comprising a receptacle having a pair of side walls, an end wall, and a bottom wall connecting said end and side walls but of a length less than that of said side walls and providing a space between said side walls beyond the end of said bottom wall remote from said end wall, an inclined transverse wall extending across the end of the bottom wall remote from said end wall and joining said side walls, said transverse wall having an upper edge terminating in spaced relation to the upper edge of said side walls, said transverse wall forming a ramp over which nuts can pass into said receptacle, a wall pivoted between and adjacent the upper portion of said side walls at the ends of the latter remote from said end wall to swing along said ramp in relatively close relation thereto and an operating member connected to said pivoted wall for producing swinging movement thereof to propel nuts over said ramp into said receptacle.

5. A harvesting device comprising a receptacle having walls providing a space in the bottom of said receptacle, a rearwardly inclined transverse wall extending across one end of the receptacle, said transverse wall having an upper edge terminating in spaced relation to the upper surface of the receptacle and forming a ramp over which nuts can pass into said receptacle, an end wall adjacent said space pivoted in spaced relation to said transverse ramp forming wall a distance slightly greater than the width of said pivoted end wall so that the latter may swing along said ramp in relatively close relation thereto, and means connected to said pivoted end wall for producing swinging movement thereof to propel nuts over said ramp into said receptacle.

References Cited in the file of this patent

UNITED STATES PATENTS

| Number | Name | Date |
|---|---|---|
| 507,826 | Miller | Oct. 31, 1893 |
| 908,208 | Crawford | Dec. 29, 1908 |
| 973,539 | Milliken | Oct. 25, 1910 |
| 2,317,489 | Scull | Apr. 27, 1943 |
| 2,427,486 | Wyland | Sept. 16, 1947 |